E. ABER.
SAW SET.
APPLICATION FILED MAY 31, 1916.

1,223,923.  Patented Apr. 24, 1917.

WITNESSES
Edw. Thorpe
G. B. Marshall

INVENTOR
Edgar Aber
BY
ATTORNEYS

UNITED STATES PATENT OFFICE.

EDGAR ABER, OF ST. JOSEPH, MICHIGAN.

SAW-SET.

1,223,923. Specification of Letters Patent. Patented Apr. 24, 1917.

Application filed May 31, 1916. Serial No. 100,789.

*To all whom it may concern:*

Be it known that I, EDGAR ABER, a citizen of the United States, and a resident of St. Joseph, in the county of Berrien and State of Michigan, have invented a new and Improved Saw-Set, of which the following is a full, clear, and exact description.

My invention has for its object to provide a handsaw set which may be manufactured at little expense and which will permit of adjustment so that the amount of set may be regulated as desired.

With my saw set the saw blade is always held in the same position in the saw set irrespective of the amount of set required, the desired amount of set being obtained by an adjustment of a fulcrum member, which adjustment may be quickly made.

Additional objects of the invention will appear in the following specification in which the preferred form of my invention is described.

In the drawings similar reference characters refer to similar parts in all the views in which—

Figure 1:
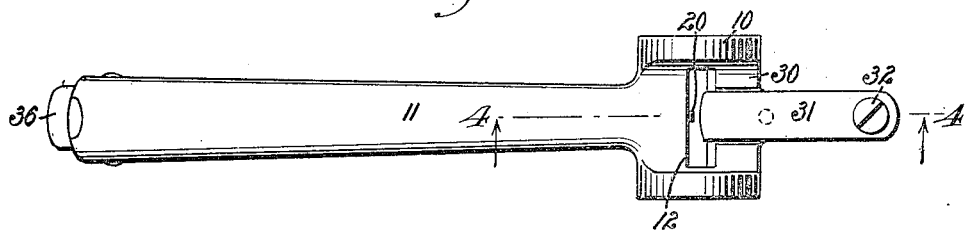
Figure 1 is a bottom view of the saw set.
Figure 2:
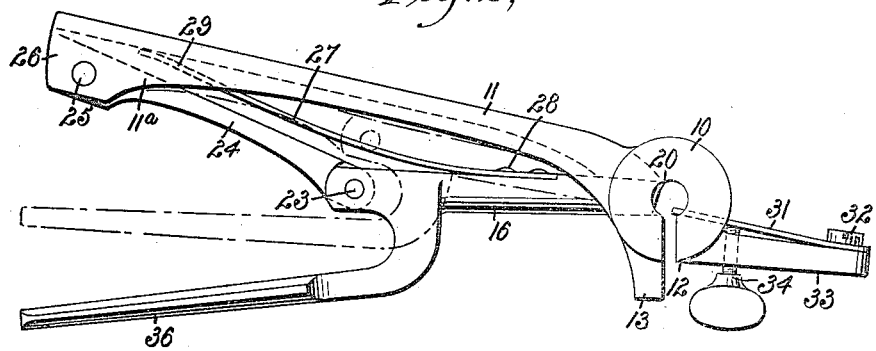
Fig. 2 is a side elevation of Fig. 1.
Figure 3:
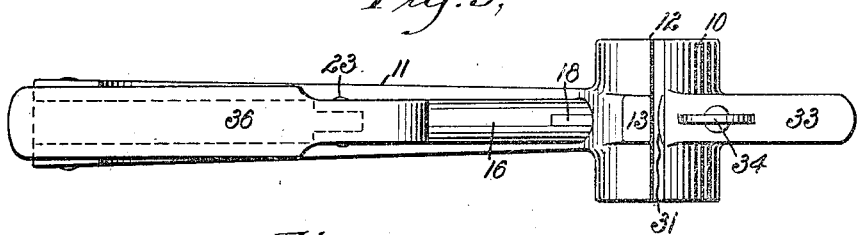
Fig. 3 is a plan view of the saw set.
Figures 4, 5:
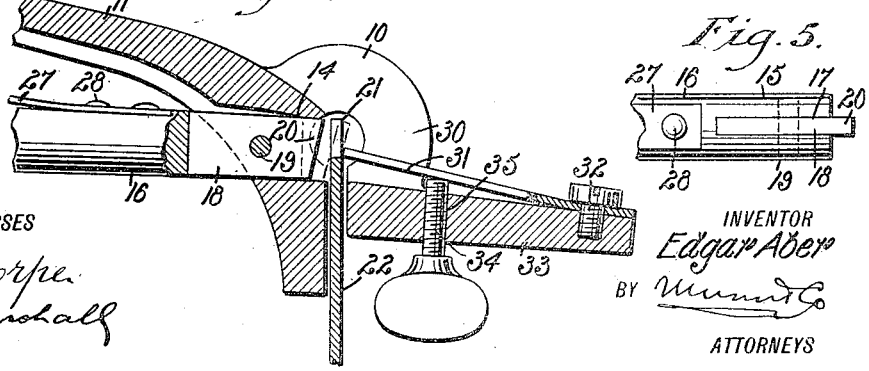
Fig. 4 is an enlarged sectional view on the line 4—4 of Fig. 1.
Fig. 5 is a fragmentary view illustrating the manner in which the die is mounted on the toggle joint.

Referring to the drawings it will be seen that a frame 10 is provided having a handle 11, there being a transverse guideway 12 in the frame 10 in which a saw blade may be introduced in a manner readily understood. The frame 10 has an extending shoulder 13 at one side of the transverse guideway to assist in holding the saw blade in position in the guideway. The frame 10 adjacent the handle 11 is provided with an opening 14 in which the end 15 of the toggle joint 16 is disposed. The said end 15 of the toggle joint member having a slot 17 in which a die 18 is disposed, the said die 18 being held in position in the slot 17 by a pin 19 which extends into orifices in the end 15 of the toggle joint at the sides of the slot 17, an end 20 of the die 18 projecting in the end 15 of the toggle joint member so that this end 20 of the die may press against the saw teeth 21 of the saw blade 22 as best shown in Fig. 4 of the drawings; a die 18 with an end 20 of any desired angle may be used having in mind the particular work which is to be done.

The toggle joint member 16 is pivoted at 23 to another toggle joint member 24, the said toggle joint member 24 being pivoted at 25 to the end 26 of the handle 11; a spring 27 is secured to the toggle joint member 16 at 28, the other end 29 of this spring 27 being disposed between the extending sides 11ᵃ to the handle 11 by which means the end 29 of the spring 27 is prevented from lateral displacement.

The frame 10 is cut away at 30 forming an opening opposite the opening 14 and in this opening there projects a spring fulcrum member 31, this spring fulcrum member 31 being secured at 32 to an extension 33 of the frame 10 the spring fulcrum member 31 being adjusted by means of a screw 34 which meshes in a threaded opening 35 in the extension 33 it being possible to turn the screw 34 to move the spring fulcrum member 31 for adjusting purposes. When the screw 34 has been moved to adjust the spring fulcrum member 31 as may be desired, a saw blade 22 is introduced in the transverse slot 12 on the frame 10 and the die 20 is operated by means of the toggle joint which in turn is operated by the handle 36 which is secured to the toggle joint member 16 and which is disposed rearwardly so that the operator may grasp the handle 11 and the handle 36 in one hand and by pressing the handle 36 in the direction of the handle 11 operate the die 20.

Having thus described my invention, I claim as new and desire to secure by Letters Patent;

1. In a saw set, a frame having a guideway for a saw blade, there being two openings extending through the frame one at each side of the guideway and both leading thereto, a member carrying a die disposed through one opening, means to operate the member, and a fulcrumed member disposed through the other opening and movable transversely relatively thereto while substantially maintaining its distance from the die when the first member is at rest.

2. In a saw set a frame having a transverse guideway for a saw blade there being two openings in the frame one at each side of the transverse guideway and both leading thereto, a spring fulcrum member secured at one end to the frame and with its other end disposed through one of the openings and extending into the transverse guideway there being a threaded orifice leading to the spring fulcrum member at a distance from its first mentioned end, a screw meshing in the threaded orifice and engaging the spring fulcrum member for adjusting the latter, a member carrying a die disposed through the other opening and means to operate the last mentioned member.

3. In a saw set, a frame having a transverse guideway for a saw blade, there being two openings in the frame one at each side of the transverse guideway and both leading thereto, a member carrying a die disposed at one of the openings, a second member mounted to move on an axis parallel with the longitudinal path of the guideway and having an end disposed in substantially the same longitudinal plane as the first member and extending through the other opening, the second member being adapted to be adjusted in the said opening, and means to operate the first mentioned member.

4. In a saw set a frame having a transverse guideway for a saw blade there being an opening in the frame at one side of the transverse guideway and leading thereto, a fulcrum member on the frame at the other side of the transverse guideway, a toggle joint having a member carrying a die and extending through the opening, a handle for the frame extending in the same general direction as the toggle joint the outer end of the other member of the toggle joint being pivoted to the handle and an outwardly extending handle on a member of the toggle joint which may be grasped with the handle of the frame for the purpose specified.

5. In a saw set a frame having a transverse guideway for a saw blade there being an opening in the frame at one side of the transverse guideway and leading thereto, a fulcrum member on the frame at the other side of the transverse guideway, a toggle joint having a member carrying a die and extending through the opening, a handle for the frame extending in the same general direction as the toggle joint, the outer end of the other member of the toggle joint being pivoted to the handle, an outwardly extending handle on a member of the toggle joint which may be grasped with the handle of the frame for the purpose specified, and resilient means for holding the central portion of the toggle joint yieldingly extended from the handle of the frame.

6. In a saw set a frame having a transverse guideway for a saw blade there being two openings in the frame, one at each side of the transverse guideway and both leading thereto, a spring fulcrum member secured at one end to the frame and with its other end disposed through one of the openings and extending in the transverse guideway there being a threaded orifice in the frame leading to the spring fulcrum member at a distance from its first mentioned end, a screw meshing in the threaded orifice and engaging the spring fulcrum member for adjusting the latter, a toggle joint having a member carrying a die and extending through the other opening in the frame, a handle for the frame extending in the same general direction as the toggle joint, the outer end of the other member of the toggle joint being pivoted to the handle, and an outwardly extending handle on the member of the toggle joint which may be grasped with the handle of the frame for the purpose specified.

EDGAR ABER.

Copies of this patent may be obtained for five cents each, by addressing the "Commissioner of Patents, Washington, D. C."